United States Patent
Göb et al.

(10) Patent No.: US 10,605,348 B2
(45) Date of Patent: Mar. 31, 2020

(54) COMPRESSION RING FOR CHAIN SPROCKET

(71) Applicant: Schaeffler Technologies AG & Co. KG, Herzogenaurach (DE)

(72) Inventors: Matthias Göb, Fürth (DE); Gustavo Gomes, Royal Oak, MI (US); Petrus Hubertus Kroon, Obermichelbach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 221 days.

(21) Appl. No.: 15/682,591

(22) Filed: Aug. 22, 2017

(65) Prior Publication Data

US 2018/0058566 A1     Mar. 1, 2018

Related U.S. Application Data

(60) Provisional application No. 62/378,602, filed on Aug. 23, 2016.

(51) Int. Cl.
*F16H 57/00* (2012.01)
*F16H 7/06* (2006.01)
*F16H 55/30* (2006.01)

(52) U.S. Cl.
CPC .......... *F16H 57/0006* (2013.01); *F16H 7/06* (2013.01); *F16H 2055/306* (2013.01)

(58) Field of Classification Search
CPC ...... F16H 55/30; F16H 2055/306; F16H 7/06; F16H 57/0006; F16H 2055/086

USPC .................................................. 474/161, 156
See application file for complete search history.

(56) References Cited

U.S. PATENT DOCUMENTS

| | | | | |
|---|---|---|---|---|
| 975,938 A * | 11/1910 | Downey | ................. | F16H 55/30 474/161 |
| 4,261,214 A * | 4/1981 | Watanabe | ................ | B62M 9/00 474/151 |
| 4,867,733 A * | 9/1989 | Yamanoi | ................... | B62M 9/00 474/161 |
| 5,966,921 A * | 10/1999 | Shimaya | ................... | F01L 1/02 59/35.1 |
| 5,980,408 A * | 11/1999 | Schulz | ....................... | F16H 7/06 474/151 |
| 5,984,817 A * | 11/1999 | Schulz | ....................... | F16H 7/06 474/156 |
| 6,179,741 B1 * | 1/2001 | Young | ....................... | F16H 7/06 474/156 |
| 6,371,875 B2 | 4/2002 | Young | | |
| 6,652,402 B2 * | 11/2003 | Poiret | ..................... | F16G 13/06 474/156 |

(Continued)

*Primary Examiner* — Henry Y Liu
(74) *Attorney, Agent, or Firm* — Reid A. Baldwin (57) ABSTRACT

A compression ring of a chain sprocket is provided with improved wear characteristics and damping to match various forms of link plates of a chain assembly. The chain assembly includes a plurality of longitudinal link plates hingedly connected by a plurality of pins. The compression ring includes two arrays of compression pads, each array defined by a different profile. Each array of compression pads can be matched to two corresponding groups of link plates. Multiple forms of compression pads and link plate geometries can be accommodated. Compression pad damping force can be tuned by adjusting the width and/or height of the link plates.

15 Claims, 6 Drawing Sheets

(56) References Cited

U.S. PATENT DOCUMENTS

| | | | | |
|---|---|---|---|---|
| 6,656,072 B2* | 12/2003 | Sugita | ............. | B62M 7/02 |
| | | | | 474/156 |
| 7,074,147 B2* | 7/2006 | Young | ............. | F16H 7/06 |
| | | | | 474/156 |
| 7,094,170 B2* | 8/2006 | Young | ............. | F16G 13/04 |
| | | | | 474/153 |
| 8,202,185 B2* | 6/2012 | Haesloop | ............. | F16H 55/30 |
| | | | | 474/156 |
| 9,145,965 B2* | 9/2015 | Kwon | ............. | F16H 55/30 |
| 10,359,107 B2* | 7/2019 | Young | ............. | F16H 55/30 |
| 2002/0169044 A1* | 11/2002 | Young | ............. | F16H 7/06 |
| | | | | 474/152 |
| 2005/0130779 A1* | 6/2005 | Sudo | ............. | F01L 1/02 |
| | | | | 474/213 |
| 2007/0111833 A1* | 5/2007 | Young | ............. | F16H 7/06 |
| | | | | 474/152 |
| 2011/0300977 A1* | 12/2011 | Hayami | ............. | F16H 55/30 |
| | | | | 474/161 |
| 2015/0045165 A1* | 2/2015 | Kwon | ............. | F16H 55/30 |
| | | | | 474/161 |
| 2015/0176692 A1* | 6/2015 | Roh | ............. | F16H 55/30 |
| | | | | 474/156 |
| 2017/0030453 A1* | 2/2017 | Young | ............. | F16H 55/30 |
| 2018/0180156 A1* | 6/2018 | Koller | ............. | F16H 55/14 |

* cited by examiner

COMPRESSION RING FOR CHAIN SPROCKET

INCORPORATION BY REFERENCE

The following document is incorporated herein by reference as if fully set forth: U.S. Provisional Patent Application No. 62/378,602, filed Aug. 23, 2016.

TECHNICAL FIELD

Example aspects described herein relate to sprockets for chain drive systems, particularly compression rings for sprockets for chain meshing noise abatement.

BACKGROUND

Chain drive systems are often utilized in many drive systems, such as those found in internal combustion (IC) engines. These chain drive systems include drive chains and sprockets that can transfer rotational power from the crankshaft to such components as camshafts, balance shafts, water pumps, and oil pumps. An example of a chain drive system is disclosed in U.S. Pat. Nos. 7,293,538 and 6,923,154. Inherent to these systems is a meshing noise that occurs between the drive chain and sprockets.

Elastomeric or compression rings applied to chain sprockets are known and are often utilized to dampen or reduce the meshing noise between a drive chain and a chain sprocket. U.S. Pat. No. 6,179,741 describes such a compression ring. In some instances, excessive wear of the compression rings occurs and can reduce the effectiveness of noise abatement over the lifetime of the sprocket component or IC engine.

Figure 10:
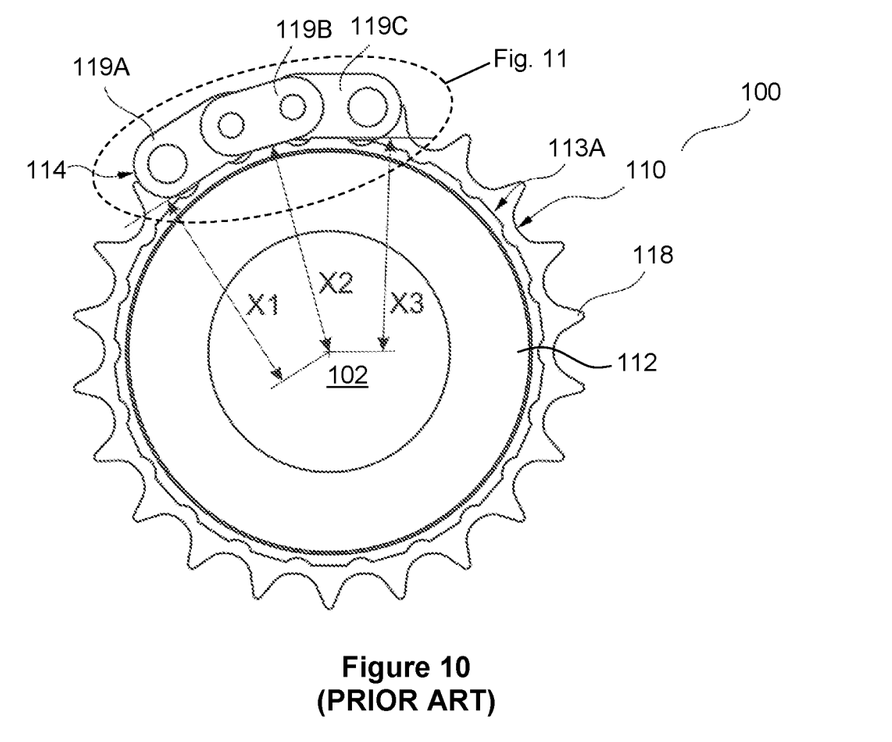
FIG. 10 is a front view of a prior art assembly of a sprocket, compression ring and chain assembly.
Figure 11:
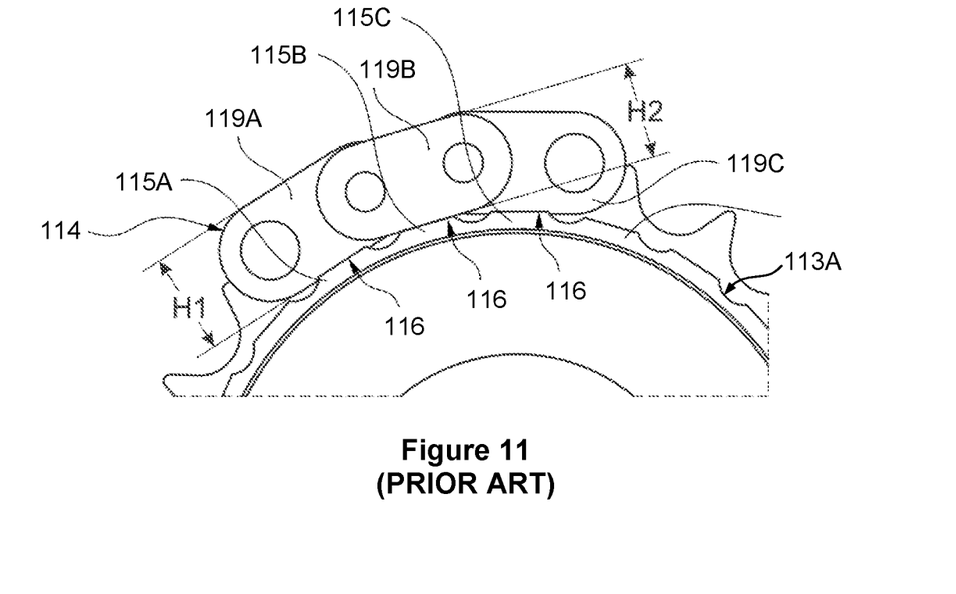
FIG. 11 is a detailed view taken from FIG. 9.
Figure 12:
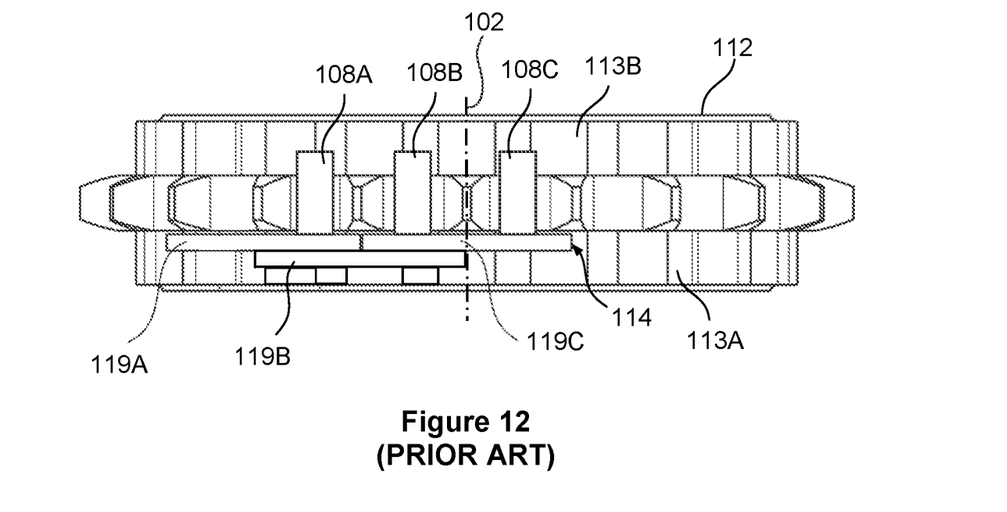
FIG. 12 is a top view of the components of FIG. 9.

FIGS. 10 through 12 show a prior art chain and sprocket system 100 that includes a sprocket 110, and a chain assembly 114. The sprocket 110 includes a plurality of teeth 118 arranged circumferentially and projecting radially from a middle portion of a hub 112. A first compression ring 113A is arranged on a front portion of the hub 112, axially adjacent to the teeth 118, and a second compression ring 113B is arranged on a rear portion of the hub 112, axially adjacent to the teeth 118. The first compression ring 113A includes a first compression pad 115A, a second compression pad 115B, and a third compression pad 115C amongst several compression pads arranged circumferentially on the compression ring 113A.

The chain assembly 114 includes a first, second and third link plate 119A-119C, and pins 108A-108C that engage the plurality of teeth 118 arranged around the circumference of the sprocket 110. The height of first and third link plates 119A and 119C are equivalent, denoted as H1 within FIG. 10; the height of the second link plate 119B, denoted as H2 within FIG. 11, is smaller than the height H1 of the first and third link plates 119A, 119C.

Referring to FIG. 11, the three compression pads 115A-115C, shown in an uncompressed state, have an identical surface profile 116 and are aligned with the first 119A, second 119B, and third link plates 119C. Additionally, a radial distance X1, X2, and X3 from an outer-most portion of the profiles 116 of the three compression pads 115A-115C to a central axis 102 is constant; thus, X1=X2=X3. Compression pads are typically made out of an elastomeric material, providing a resistive force when compressed by an interfacing link plate, to counteract a rapid engagement of sprocket teeth 118 by the pins 108A-108C of the chain assembly 114. Due to the smaller height H2 of the second 119B link plate compared to the first 119A and third 119C link plates, and the previously described equi-distant profiles 116 of the three compression pads 115A-115C, the second compression pad 115B will be compressed less than its neighboring first 115A and third 115C compression pads. This unequal compression will result in unequal resistive forces or damping characteristics, potentially resulting in undesirable noise and excessive wear on the first and third compression pads 115A, 115C.

A durable solution is required that provides for effective noise abatement for chain assemblies that have link plates of differing forms and/or sizes.

SUMMARY OF THE INVENTION

A sprocket is provided for a chain drive system having a plurality of circumferentially arranged teeth configured to receive a chain assembly, and at least one compression ring arranged axially adjacent to either side of the teeth. The at least one compression ring is configured with a first and a second array of compression pads, each array defined by a different first and a second profile, respectively. The two arrays of compression pads can be matched with two groups of longitudinal link plates hingedly connected by a plurality of pins within a chain assembly. The two arrays of compression pads can have different radial heights and/or different forms. The two groups of link plates can have different heights, thicknesses or forms. A timing mark can be arranged on each of the sprocket and the chain to ensure proper alignment with the groups of link plates and arrays of compression pad profiles.

BRIEF DESCRIPTION OF THE DRAWINGS

The above mentioned and other features and advantages of the embodiments described herein, and the manner of attaining them, will become apparent and better understood by reference to the following descriptions of multiple example embodiments in conjunction with the accompanying drawings. A brief description of the drawings now follows.

DETAILED DESCRIPTION OF THE EMBODIMENTS

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis. Radially refers to directions that are perpendicular to the central axis. Circumferentially refers to an outer boundary of a circle or curve. The words "left" and "right" designate directions in the drawings to which reference is made. The terminology includes the words specifically noted above, derivatives thereof, and words of similar import.

Figure 1:
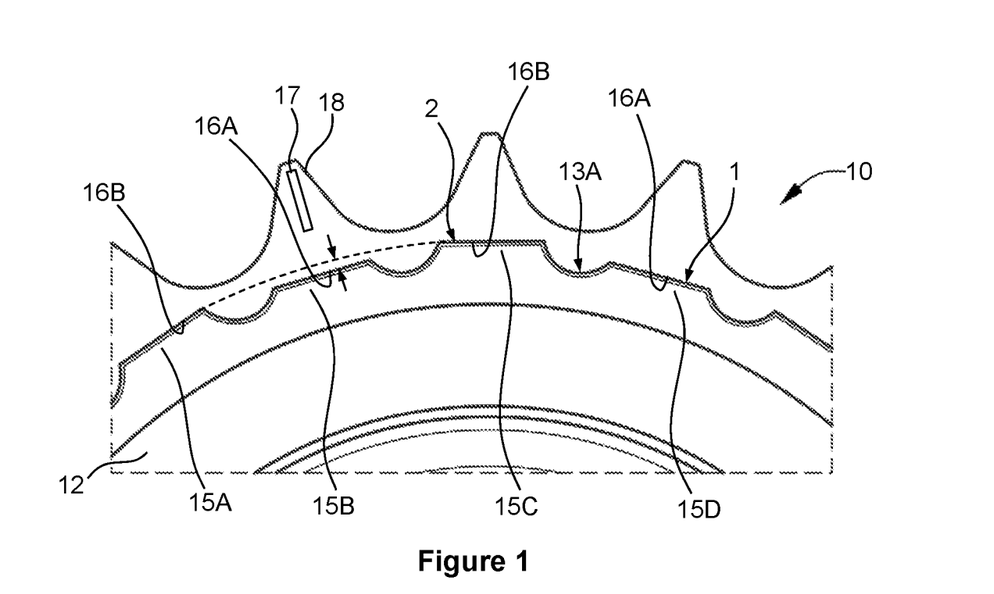
FIG. 1 is a partial front view of an example embodiment of a compression ring installed on a chain sprocket.
Figure 2:
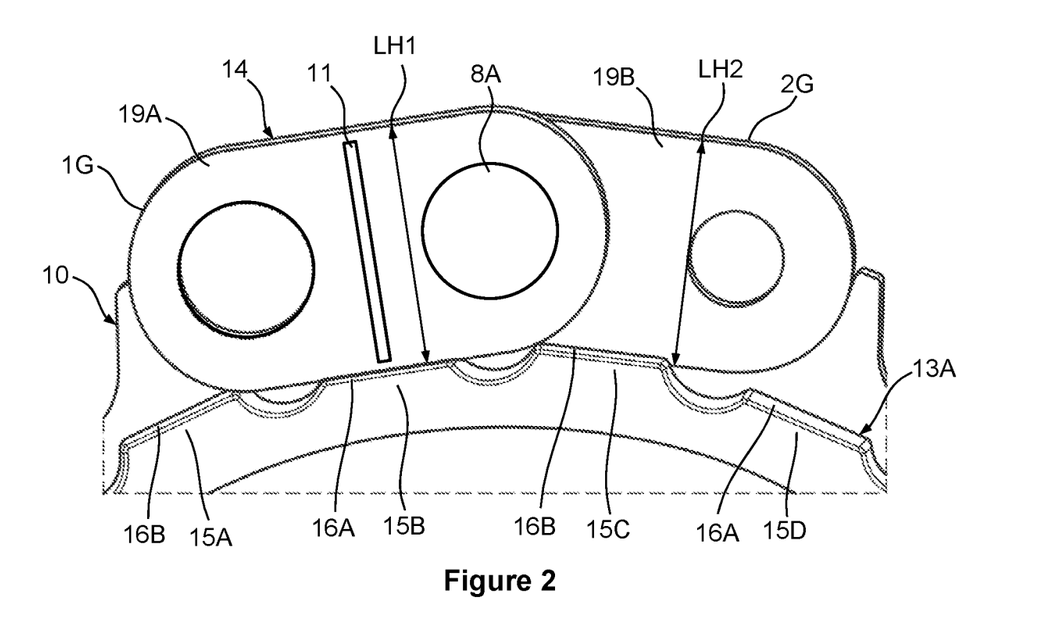
FIG. 2 is a partial front view of a chain assembly installed on the chain sprocket and compression ring assembly of FIG. 1.
Figure 3:
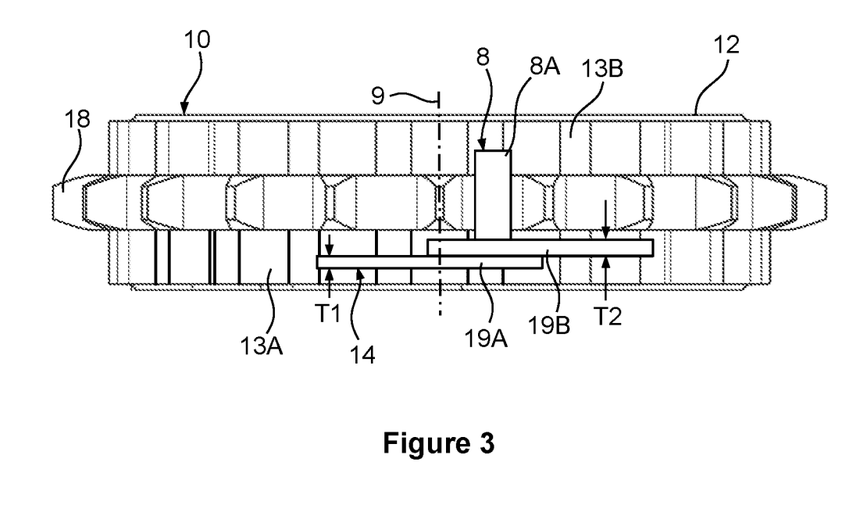
FIG. 3 is a top view of the components of FIG. 2.

A compression ring of a chain sprocket is provided with an optimized form for improved wear characteristics and damping for chain assemblies having link plates of different sizes and/or forms. FIGS. 1 through 3 show an example embodiment of a chain sprocket 10 that includes a central axis 9, and a plurality of teeth 18 arranged circumferentially and projecting radially from a middle portion of a hub 12. A first compression ring 13A is arranged on a front portion of the hub 12, axially adjacent to the teeth 18. Optionally, a second compression ring 13B is arranged on a back portion of the hub 12, also axially adjacent to the teeth 18. The first compression ring 13A, includes a first compression pad 15A, a second compression pad 15B, a third compression pad 15C, and a fourth compression pad 15D amongst several compression pads arranged circumferentially on the first compression ring 13A. The first and third compression pads 15A, 15C have a second profile 16B and the second and fourth compression pads 15B, 15D have a first profile 16A. The different first and second profiles 16A, 16B alternate circumferentially throughout the compression ring 13A, with an outer-most portion of the second profile 16B protruding further radially than an outer-most portion of the first profile 16A, as shown in FIG. 1. Alternatively stated, a radial distance from the outer-most portion of the second profile 16B to the central axis 9 is greater than a radial distance from the outer-most portion of the first profile 16A to the central axis 9. Correspondingly, the first profile 16A is arranged on even-numbered compression pads, classified as a first array 1; the second profile 16B is arranged on odd-numbered compression pads, classified as a second array 2. The first 1 and second 2 arrays populate all of the compression pads 15 arranged on the compression ring 13A.

Referring now to FIGS. 2 and 3, a tall longitudinal link 19A, a short longitudinal link 19B, and a first pin 8A that hingedly connects the tall 19A and short 19B links of a chain assembly 14 that is received by the teeth 18 of the chain sprocket 10. The tall link 19A has a first link height LH1 that is greater than a second link height LH2 of the short link 19B. The tall and short links 19A, 19B alternate throughout the chain assembly 14, with the tall links 19A populating a first group 1G and the short links 19B populating a second group 2G, all hingedly connected by a plurality of pins 8. As shown in FIG. 2, the tall link 19A is matched with the second compression pad 15B configured with the first profile 16A and the second link 19B is matched with the third compression pad 15C configured with the second profile 16B. Therefore, the first group 1G populated with tall links 19A is matched with the first array 1 of compression pads (lower radial height), and the second group 2G populated with short links 19B is matched with the second array 2 of compression pads (greater radial height). With this described matching strategy, a resultant magnitude of compression of the compression pads can be equalized amongst the first and second arrays 1, 2, which provides for uniform damping for both tall and short links 19A, 19B. Additionally, equalized compression of compression pads yields uniform wear amongst both arrays 1, 2, as increased compression as a result of a tall link 19A compressing the second profile 16B compression pad could lead to reduced durability of the compression ring 13.

In order to facilitate the previously described matching of link groups 1G, 2G with compression pad arrays 1, 2, a sprocket timing mark 17 can be utilized to guide alignment of a corresponding chain timing mark 11 upon installation of the chain assembly 14. Furthermore, to provide continuous matching of link groups 1G, 2G with compression pad arrays 1, 2 an even number of sprocket teeth 18 is required. However, there could be instances where an odd number of sprocket teeth 18 could provide a targeted noise benefit, such as out-of-round damping that would result from different compression pad-array-to-link-group plate pairings in successive sprocket 10 revolutions, which could favorably effect critical frequencies of a chain drive system.

Figure 5:
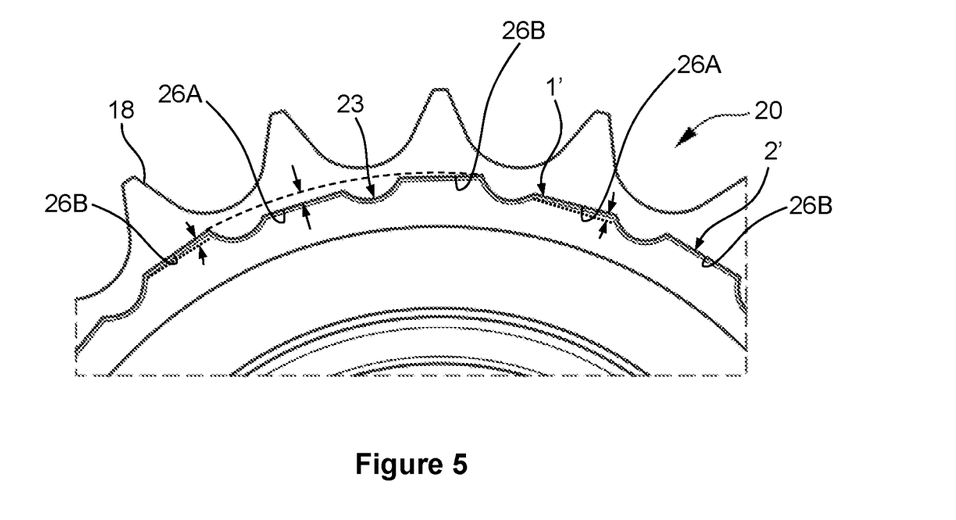
FIG. 5 is a partial front view of an example embodiment of a compression ring installed on a chain sprocket.

Many different forms of first and second arrays of compression pads are possible. FIG. 5 shows an example embodiment of a chain sprocket 20 with a compression ring 23 having an angled first profile 26A and an angled second profile 26B, that populate respective first 1' and second arrays 2'. An outer-most portion of the second profile 26B protrudes further radially than an outer-most portion of the first profile 26A; therefore, the first profile 26A is different than the second profile 26B even though the forms (angled) are similar. Profile characteristics other than radial protrusion height can also classify a first profile as being "different" from a second profile.

Figure 6:
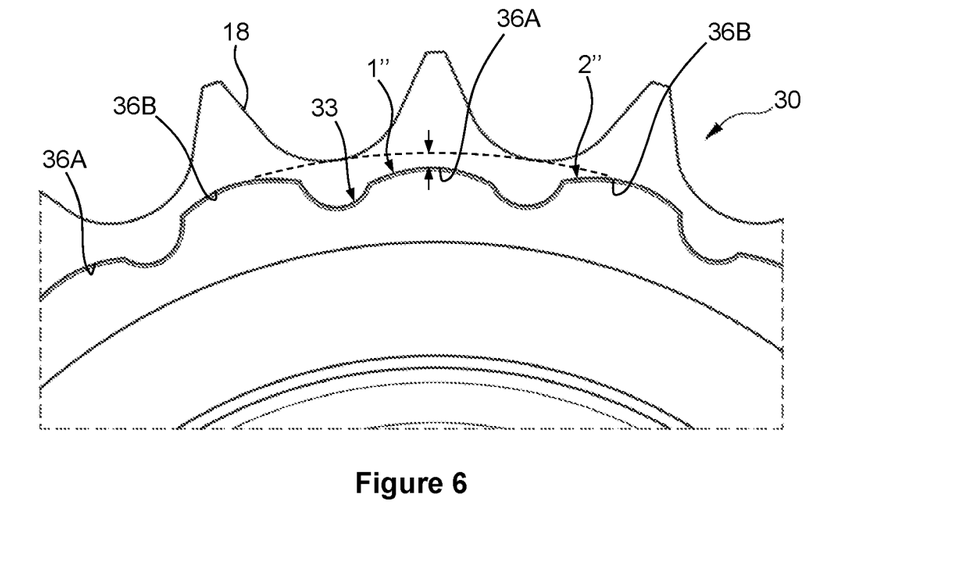
FIG. 6 is a partial front view of an example embodiment of a compression ring installed on a chain sprocket.

FIG. 6 shows an example embodiment of a chain sprocket 30 with a compression ring 33 having a domed first profile 36A and a domed second profile 36B, populating respective first 1" and second arrays 2". An outer-most portion of the second profile 36B protrudes further radially than an outer-most portion of the first profile 36A.

Figure 8:
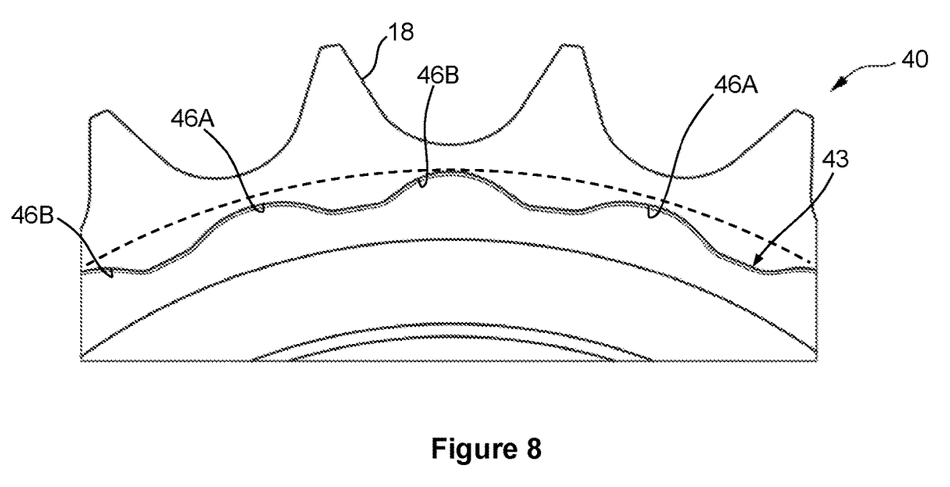
FIG. 8 is a partial front view of an example embodiment of a compression ring installed on a chain sprocket.

FIG. 8 shows an example embodiment of a chain sprocket 40 with a compression ring 43 having a round first profile 46A and a round second profile 46B. An outer-most portion of the second profile 46B protrudes further radially than an outer-most portion of the first profile 46A. Those that are skilled in the art of compression rings would understand that many other shapes could be utilized for compression pads.

Figure 9:
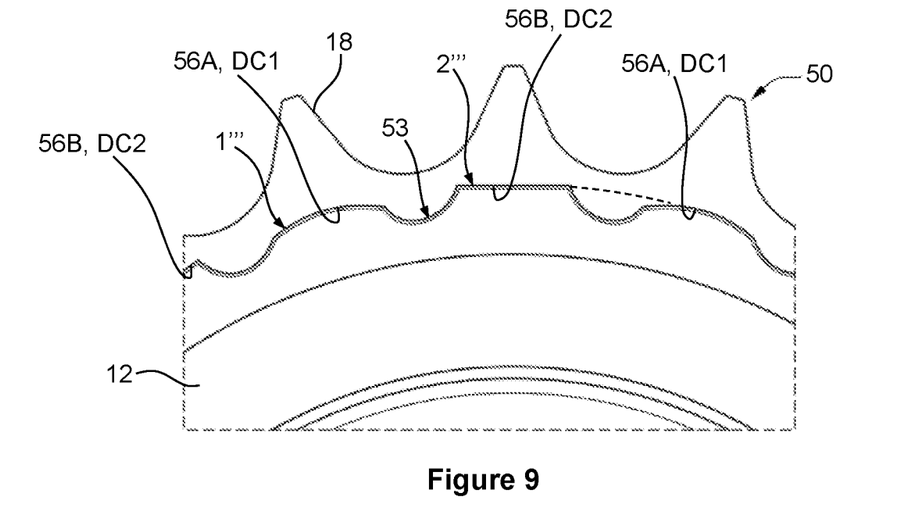
FIG. 9 is a partial front view of an example embodiment of a compression ring installed on a chain sprocket.

FIG. 9 shows an example embodiment of a chain sprocket 50 with a compression ring 53 that utilizes a form for a first profile 56A that is different than a form of a second profile 56B. The first profile 56A is similar in form to that of the profiles 36A, 36B of FIG. 6, and the second profile is similar in form to that of the profiles 16A, 16B of FIG. 1. With the different profile forms 56A, 56B, it could be possible to have a different damping characteristic DC1, DC2 for each respective form 56A, 56B. The damping characteristic defines how much resistance force is provided versus a given amount of compression of a compression pad. The resistance force versus compression relationship can be linear or non-linear. Therefore, even though the first and second profile 56A, 56B have the same radial protrusion height (noted by broken line in FIG. 9), the different damping characteristic DC1, DC2 for the first and second profiles could be matched with chain assemblies having two groups of links differentiated by form or height, providing equal or similar damping for both groups. Furthermore, FIG. 9's embodiment exemplifies that the first and second profiles can have equal radial protrusion heights, yet are still classified as being "different."

Systematic damping characteristic tuning could be accomplished by adjusting one or more size specifications of a link plate. Referencing FIG. 2, link plate height LH1, LH2 could be varied to reduce or increase compression pad 15A-D compression resultant damping. Referencing FIG. 3, link plate thickness T1, T2 could also be varied to change the damping characteristic of a chain drive system.

Figure 4:
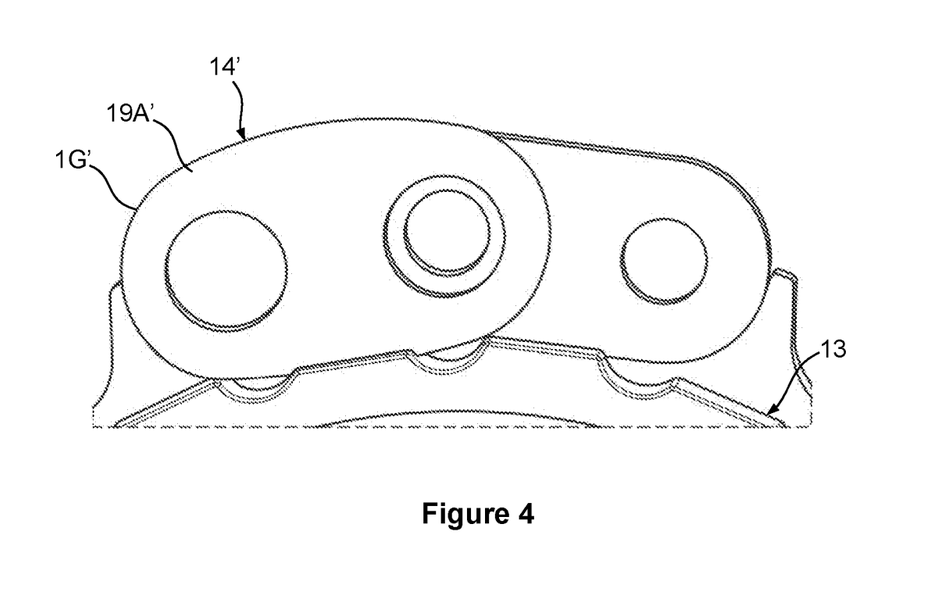
FIG. 4 is a partial front view of a chain assembly installed on the chain sprocket and compression ring assembly FIG. 1.
Figure 7:
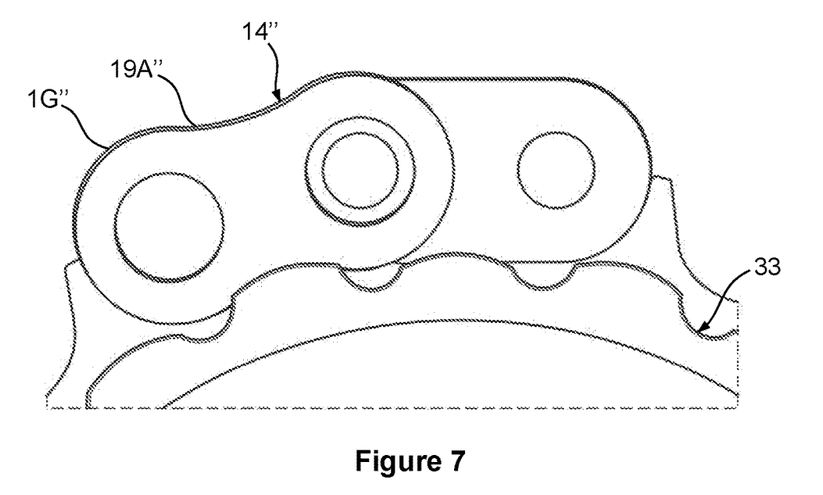
FIG. 7 is a partial front view of a chain assembly installed on the chain sprocket and compression ring assembly of FIG. 6.

Those that are skilled in the art of compression rings would understand that many different forms of longitudinal link plates are possible. Referring to FIG. 4, an example embodiment of a chain assembly 14' is shown with a convex-shaped first link 19A' populating a first group 1G'; referring to FIG. 7, yet another example embodiment of a chain assembly 14" is shown with a concave-shaped first link 19A" populating a first group 1G". These example embodiments are two of many that could be utilized with a compression ring having two arrays of compression pads.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

What we claim is:

1. A chain drive system, comprising:
    a chain assembly having:
        a plurality of longitudinal link plates hingedly connected by a plurality of pins, wherein the plurality of longitudinal link plates is comprised of a first group having a first height and a second group having a second height; and
    a sprocket having:
        a plurality of circumferentially arranged teeth configured to receive the chain assembly;
        at least one compression ring arranged axially adjacent to either side of the teeth, the compression ring configured with a first array and a second array of compression pads; and,
        the first array of compression pads is defined by a first profile and the second array of compression pads is defined by a second profile, different than the first profile;
    wherein:
        the first profile is defined by a first radial distance from an outer-most portion of the first profile to the center of the sprocket, and the second profile is defined by a second radial distance from an outer-most portion of the second profile to the center of the sprocket;
        the first group exclusively engages the first array;
        the second group exclusively engages the second array;
        the first height exceeds the second height, and
        the first radial distance is less than the second radial distance.

2. The chain drive system of claim 1, wherein the first and second arrays are arranged in an alternating circumferential pattern throughout the at least one compression ring.

3. The chain drive system of claim 1, wherein the first and second arrays have different damping characteristics.

4. The chain drive system of claim 1, wherein the first array is applied to odd number compression pad locations and the second array is applied to even number pad locations.

5. The chain drive system of claim 1, wherein the first and second groups have different forms.

6. The chain drive system of claim 1, wherein the sprocket has an even number of teeth.

7. The chain drive system of claim 6, further comprising a first timing mark arranged on the chain and a second timing mark arranged on the sprocket.

8. The chain drive system of claim 7, wherein the first group engages the first array and the second group engages the second array.

9. A sprocket for a chain drive system, the sprocket having:
    a plurality of circumferentially arranged teeth configured to receive a chain assembly;
    at least one compression ring arranged axially adjacent to either side of the teeth, the compression ring configured with a first array and a second array of compression pads, the compression pads circumferentially aligned with the teeth; and,
    the first array of compression pads is defined by a first profile and the second array of compression pads is defined by a second profile, different than the first profile.

10. The sprocket of claim 9, wherein the first and second arrays are arranged in an alternating pattern.

11. The sprocket of claim 10, wherein the first profile is defined by a first radial distance from an outer-most portion of the first profile to the center of the sprocket, and the second profile is defined by a second radial distance from an outer-most portion of the second profile to the center of the sprocket and wherein the first radial distance is different than the second radial distance.

12. The sprocket of claim 11, wherein the first and second arrays have different damping characteristics.

13. The sprocket of claim 12, wherein the different damping characteristics can be tuned by link plate height or link plate thickness.

14. The sprocket of claim 11, wherein the first array is applied to odd number compression pad locations and the second array is applied to even number pad locations.

15. The sprocket of claim 11, wherein the first and second arrays are each comprised of a plurality of compression pads.

* * * * *